March 9, 1943. H. C. A. POTEZ 2,313,205
TWO-SPEED DRIVING MECHANISM FOR CENTRIFUGAL COMPRESSORS
Filed May 11, 1939 2 Sheets-Sheet 1

Patented Mar. 9, 1943

2,313,205

UNITED STATES PATENT OFFICE 2,313,205

TWO-SPEED DRIVING MECHANISM FOR CENTRIFUGAL COMPRESSORS

Henry Charles Alexandre Potez, Meaulte, Somme, France; vested in the Alien Property Custodian Application May 11, 1939, Serial No. 273,151
In France June 10, 1938

3 Claims. (Cl. 230—114)

In an internal combustion engine for aircraft, which is provided with a mechanically-operated compressor adapted for the restoration of the power at a certain altitude, the higher is this altitude, the less power will be given by the engine on the ground for the same pressure of admission. This difference of power may be as great as 20% for an altitude of restoration of 4000 metres. In these conditions, the take off power may not be sufficient and this reduction of power must therefore be limited as far as possible. One method employed for this purpose consists in providing for an effective over-feeding when on the ground by increasing the admission pressure, but this greatly increases the strain upon the engine.

Another method, which appears to be the best, consists in varying the speed of the compressor relatively to the engine speed, in order to reduce the loss of power on the ground or at intermediate altitudes.

For example there may be provided a mechanical connecting device having two speeds. The first speed of the compressor is determined in order to provide for the best conditions of operation on the ground, and the second speed serves to restore the power at a stated pressure of admission and altitude.

Hitherto, the two-speed devices have been mounted in the interior of the engine between the rotor of the compressor and the crank-shaft, but this greatly reduced the accessibility required for the somewhat complicated parts, the friction-clutches which these devices usually comprise were in bad condition for the evacuation of the heat generated. Moreover, the two-speed drive was often made with parts having a relatively slow rate of rotation which transmitted heavy torques, thus resulting in a great size and weight.

The present invention has for its object to provide an improved mechanism for two-speed drive of centrifugal compressors which obviates the aforesaid drawbacks. According to the invention, the said mechanism is so designed that the speed-changing device can be located beyond the compressor with reference to the main driving shaft by which this latter is actuated.

Owing to this arrangement, the speed-changing mechanism may be mounted in a separately-secured casing, which is readily removable and accessible, and provides for an effective cooling.

In one embodiment, the driving torque is transmitted to the speed-changing device by an auxiliary shaft extending axially through the rotor of the compressor which is secured to a hollow shaft loosely mounted on the said auxiliary shaft and to which it may be connected in rotation at will either by direct drive, or with increase or reduction of speed, by the said speed-changing mechanism.

Further characteristics will be set forth in the following description.

In the accompanying drawings, which are given solely by way of example:

Figure 1:
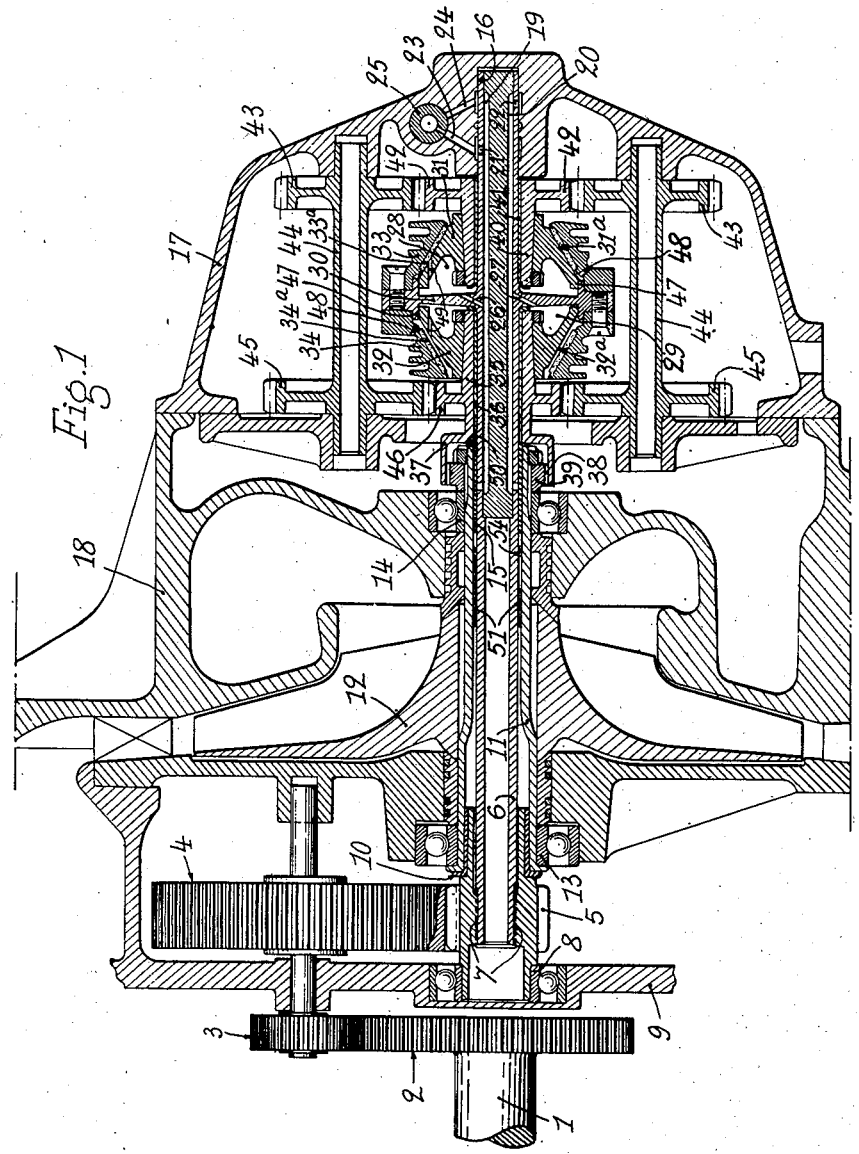
Fig. 1 is a longitudinal section of the aggregate comprising a compressor and its driving mechanism, improved according to the invention.

In the embodiment shown in Fig. 1, the main driving shaft 1 (the crank-shaft of the engine or a lay shaft) is connected by a suitable gear set 2, 3, 4, and a driving member or pinion 5 adapted to increase or reduce the speed, to an auxiliary shaft 6. The pinion 5 engages the shaft 6 by means of internal flutes or a splined connection 7, and shaft 6 is rotatable in a bearing 8 of the crank-case 9 and in a ring 10 mounted in the end of a tubular shaft 11 through which extends axially, from one end to the other, the shaft 6. It should be noted that a device for limiting the torque is preferably incorporated into the gear set 2, 3, 4, 5.

The shaft 11, through which extends freely and axially the shaft 6, is secured to the rotor 12 and is journalled in bearings 13 and 14, which may be ball-bearings. As to the said shaft 6 which is centered in the hollow shaft 11 by a ring 15, it is journalled at its other end in a bearing 16 of a removable casing 17 which is secured to the suction casing 18 of the compressor. The shaft 6 is slidable longitudinally in the pinion or driving member 5 and the bearing 16.

In the interior of the casing 17 is mounted the mechanism for direct drive and for speed-changing which is adapted to connect in rotation the shaft 6 with the tubular shaft 11. The said mechanism may be controlled by any device employing a fluid under pressure.

In the example herein represented, ducts 19 and 20 are provided in the shaft 6, starting from the bearing 16. The said ducts communicate at one end, through orifices 21 and 22 and passages 23, 24, with a distributor 25 adapted to deliver into either of these conduits a fluid under pressure which may consist of the lubricating oil of the engine; at the other end, orifices 26 and 27 connect the said ducts respectively with chambers 28 and 29 which are situated between a member 30 and the members 31 and 32.

The member 30 is secured to the shaft 6, or is preferably in one piece with the same, and participates in its longitudinal movements. Two members 33 and 34, which have a tapered form in the interior, are mounted axially on shaft 6 on either side of the member 30, and can be coupled to the complementary parts 31ª and 32ª of the members 31 and 32. Friction facings 33ª and 34ª may be fitted into the tapered parts of the members 33 and 34.

The member 32, 32ª is secured, for instance by a tapered fit, to a member 35 which is rotatable on the shaft 6 by means of a ring 36. The member 35 is connected in rotation to the shaft 11 driving the rotor 12 of the compressor by a fluted sleeve or splined connection 37 which extends the member 35 and engages the member 39 secured to the shaft 11.

The member (31, 31ª) is secured to a member 40 which is rotatable through a sleeve 41 on the shaft 6 and actuates by means of a gear-wheel 42, one or more pinions 43 each of which is secured to a shaft 44. On this shaft 44 is mounted a gear-wheel 45 engaging a pinion 46 secured to the member 35 which is in turn connected to the shaft 11 driving the rotor 12 of the compressor.

A relative tightness of the chambers 28 and 29 is ensured by the clearance existing at 47 between the member 30 and the members 31 and 32. Calibrated orifices 48 pierced in the members 33 and 34 provide for the discharge of the oil coming from 47. Other calibrated orifices 49 pierced in the operative parts 31ª and 32ª of the respective members 31 and 32 provide for their lubrication before the clutching takes place.

The operation is as follows. The pinions or torque limiting members 2, 3, 4 are actuated by the shaft 1, and they rotate the pinion or driving member 5 and hence the shaft 6 at one of the speeds of rotation intended for the compressor.

In order to obtain the first speed, or direct drive, the distributer 25 is so disposed as to circulate the fluid under pressure on the path 24, 22, 20, 27 between the members 30 and 32. The pressure ensures the coupling of the members 32 and 34, and the driving of the rotor 12 of the compressor at the speed of rotation of the shaft 6. As the member 35 is in contact at 50 with the ring 15 it is the member 30 and hence the shaft 6 which is displaced.

In order to drive the compressor at the second speed, the distributer is rotated so as to cut off the supply of oil through 24, 22, 20, 27 and to establish it through 23, 21, 19, 26. The chamber 29 between the members 30 and 32 is emptied of oil by the action of centrifugal force, owing to the imperfect sealing existing at 47, and at the same time, the pressure becomes established in the chamber 28 between the members 30 and 31, as the orifices 48 provide for a less rate of passage than the orifices 26. The oil flows through the orifices 49, and it lubricates the parts which are to be coupled. When the pressure in the chamber 28 is sufficient, the shaft 6 slides and uncouples the members 32 and 34, while coupling 31 and 33. The member 31 then actuates the compressor by means of the set of gearing 42, 43, 45, 46 at a speed which is greater or less than that of the shaft 6, according to the gear ratio in use.

It should be noted that it is preferable to give the operative parts of the coupling members the tapered form as this prevents the facings 33ª and 34ª from being torn off by centrifugal force. This also provides for a wedging action due to which in the case of a change of speed, a certain force is required in order to release the clutch. During the time necessary to produce this force, the chamber which was at first under pressure, becomes emptied of fluid, and all this furthers the reduction of the ineffective time required for the passage of one speed to another, and thus diminishes the heat produced.

In some cases, the mechanism can serve to limit the torque.

It should be further noted that the clutch discs rotate at one of the driving speeds of the compressor, that is at a relatively high speed, and the driving torque is much less than if the clutch were mounted on the shaft 1 and rotated at a slower rate. For this reason, the mechanism contained in the casing 17 has but a small size.

Figure 2:
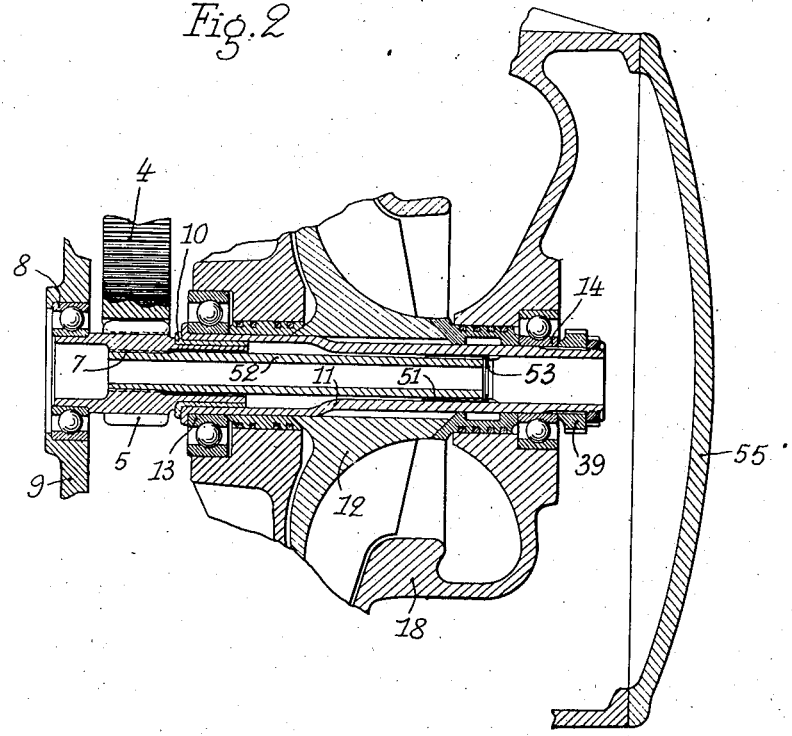
Fig. 2 shows the same compressor, in which the driving gear is replaced by a shaft adapted for direct drive.

The aforesaid mechanism has the form of a separate device which can be readily dismounted from the compressor. This latter is arranged so that in this case it may be operated by a direct drive. Figs. 1 and 2 show an example which can be realized without dismounting the compressor. The interior of the tubular shaft 11 comprises a fluted portion 51 adapted to engage the fluted end of an auxiliary shaft 52 thus forming a splined connection (Fig. 2), said shaft having a splined connection at its other end with the bore 7 of the pinion or driving member 5. A stop-piece 53 (Fig. 2) mounted in the groove 54 (Fig. 1) serves to prevent the disengagement of the shaft 52. A cover 55 which is mounted in the place of the casing 17, serves to enclose the whole. For effecting this mounting it is necessary to remove the ring 15 (Fig. 1), but it is possible to use any other connecting means, for example through the member 39 which would not necessitate the removal of said ring.

Obviously, the invention is not limited to the embodiment herein described and represented, which is given solely by way of example.

Having now described my invention what I claim as new and desire to secure by Letters Patent is:

1. A compression arrangement of the type described comprising a centrifugal compressor including a casing 18 and a rotor 12, a tubular shaft 11 rotatably supported in said casing, said rotor 12 being secured to said tubular shaft 11, a driving mechanism located on one side of said compressor and including a driving shaft 1, a driving member 5 coaxially and rotatably mounted with relation to said tubular shaft, a speed increasing gear 2—4 connecting said driving shaft and said driving member 5 and having such a transmission ratio as to rotate said driving member 5 at one speed desired for said rotor, and separate dismountable torque transmitting means located on the opposite free end of said compressor, including an auxiliary shaft 6 or 52 coaxially and rotatably mounted within said tubular shaft, splined connecting means 7 adapted to connect as to rotation said driving member 5 with the adjacent end of said auxiliary shaft 6 or 52 and detachable coupling means 52 or 30 to 39 between said auxiliary shaft 6 or 52 and said tubular shaft adapted to connect said auxiliary shaft and said tubular shaft as to rotation.

2. A compression arrangement of the type described comprising a centrifugal compressor including a casing 18 and a rotor 12, a tubular shaft 11 rotatably supported in said casing, said rotor 12 being secured to said tubular shaft 11, a driving mechanism located on one side of said compressor and including a driving shaft 1, a driving member 5 coaxially and rotatably mounted with relation to said tubular shaft, a speed increasing gear 2—4 connecting said driving shaft and said driving member 5 and having such a transmission ratio as to rotate said driving member 5 at one speed desired for said rotor, and separate dismountable torque transmitting means located on the opposite free end of said compressor, including an auxiliary shaft 6 or 52 coaxially and rotatably mounted within said tubular shaft, splined connecting means 7 adapted to connect as to rotation said driving member 5 with the adjacent end of said auxiliary shaft 6 or 52 and a change speed mechanism located on the opposite side of said rotor between said auxiliary shaft and said tubular shaft, adapted to afford selectively a direct drive of said tubular shaft and at least one transmission ratio different from 1.

3. A compression arrangement of the type described comprising a centrifugal compressor including a casing 18 and a rotor 12, a tubular shaft 11 rotatably supported in said casing, said rotor 12 being secured to said tubular shaft 11, a driving mechanism located on one side of said compressor and including a driving shaft 1, a driving member 5 coaxially and rotatably mounted with relation to said tubular shaft, a speed increasing gear 2—4 connecting said driving shaft and said driving member 5 and having such a transmission ratio as to rotate said driving member 5 at one speed desired for said rotor, and separate dismountable torque transmitting means located on the opposite free end of said compressor, including an auxiliary shaft 6 or 52 coaxially and rotatably mounted within said tubular shaft, splined connecting means 7 adapted to connect as to rotation said driving member 5 with the adjacent end of said auxiliary shaft 6 or 52 and a housing removably secured to said casing on the opposite side of said rotor, including a driven member 35 slidably connected for rotation with said tubular shaft 11, a change speed mechanism in said housing between said auxiliary shaft and said tubular shaft, adapted to afford selectively between said auxiliary shaft and said driven member a direct drive and at least one positive transmission ratio different from 1, whereby said housing, said change speed mechanism, said driven member and said dismountable torque transmitting means can be withdrawn and simplified connecting means can be adapted to connect said driving member with said tubular shaft as to rotation at one speed only.

HENRY CHARLES ALEXANDRE POTEZ.